United States Patent [19]
Hodgins

[11] Patent Number: 5,743,535
[45] Date of Patent: Apr. 28, 1998

[54] COMPRESSION PISTON RING SEAL

[75] Inventor: Sydney Gilbert Hodgins, Port Augusta, Australia

[73] Assignee: Auto-Motive Improvements Pty Ltd., Fullarton, Australia

[21] Appl. No.: 718,437

[22] PCT Filed: Aug. 15, 1994

[86] PCT No.: PCT/AU94/00473

§ 371 Date: Sep. 26, 1996

§ 102(e) Date: Sep. 26, 1996

[87] PCT Pub. No.: WO95/27133

PCT Pub. Date: Oct. 12, 1995

[30] Foreign Application Priority Data

Mar. 31, 1994 [AU] Australia .................. PM4831

[51] Int. Cl.[6] ........................................... F16J 9/06
[52] U.S. Cl. ........................................... 277/165
[58] Field of Search ...................... 277/165, 216; 525/104, 100

[56] References Cited

U.S. PATENT DOCUMENTS

| | | | |
|---|---|---|---|
| 2,940,803 | 6/1960 | Phillips | 277/216 |
| 3,525,530 | 8/1970 | Bauer et al. | 277/165 |
| 3,727,927 | 4/1973 | Packard | 277/216 |
| 3,751,047 | 8/1973 | McGee | 277/165 |
| 3,851,889 | 12/1974 | Nisper | 277/214 |
| 3,862,480 | 1/1975 | Packard et al. | 29/156.4 R |
| 3,919,448 | 11/1975 | Dufresne | 428/157 |
| 4,569,868 | 2/1986 | De Blauwe et al. | 428/35 |
| 5,197,746 | 3/1993 | Rehfeld | 277/144 |

FOREIGN PATENT DOCUMENTS 3606886  9/1987  Germany ................. 277/165

*Primary Examiner*—Scott Cummings
*Attorney, Agent, or Firm*—Baker, Maxham, Jester & Meador

[57] ABSTRACT

A sealing system for the compression ring (5) of a piston (1) of an internal combustion engine comprises placing an elastomeric material seal ring (15) behind the compression ring (5) to provide sealing to improve compression ratio and prevent loss of oil. The seal ring may be an O-ring of a neoprene/silicon blend elastomeric material of circular, U-shaped, oval, square, rectangular or trapezoidal shape, and may be hollow or solid. The seal ring may have a cross-sectional diameter of from 50% to 100% of the thickness of the compression ring (5) behind which it fits.

4 Claims, 3 Drawing Sheets

COMPRESSION PISTON RING SEAL

TECHNICAL FIELD

This invention relates to efficient sealing in automobile engines and particularly to sealing of engine cylinders in internal combustion engines to prevent loss of oil and to improve compression ratio.

BACKGROUND OF THE INVENTION

Pistons in internal combustion engines usually include three sealing rings around their periphery which engage with the cylindrical inner surface of an engine cylinder. These three sealing rings each are designed to perform a specific function. An uppermost of the seals provides a compression ring which is designed to seal during an upstroke of a piston to provide compression of the combustion gasses within the cylinder. The middle of the three rings is designed as an oil scraping ring to prevent oil from being carried up into the piston chamber and being burnt. A third ring is actually an oil spreader ring or oil control ring to provide an even film of lubricant on the piston wall. Some engines, particularly large engines, may have two or three compression rings per piston.

As wear in an engine occurs, however, these various rings do not carry out their function efficiently and an engine can burn more oil and have insufficient compression to provide inefficient and incomplete combustion of fuels. This can result in a build up of carbon deposit in the various rings and grooves which prevent the proper action of the piston rings with subsequent problems to efficiency of the engine and the burning of engine oil.

The compression ring in particular carries out a most important function but as wear occurs the ring can twist in its ring groove on both the up and down strokes of a piston and can tend to score the cylinder wall and also cause wear in the ring groove. This in turn causes further problems with sealing of the compression ring.

OBJECTS OF THE INVENTION

It is the object of this invention to provide an arrangement and a method to improve the efficiency of sealing and action of the compression ring of an internal combustion engine.

An alternative object is to provide the public with at least a useful alternative piston ring system.

SUMMARY OF THE INVENTION

In one form therefore although this may not necessarily be the only of broadest form the invention is said to reside in a piston including a compression ring groove, a compression ring in the compression ring groove and a sealing means in the compression ring groove behind the compression ring.

Preferably the sealing means is a seal ring of an elastomeric material. The seal ring of elastomeric material may be an O ring which has a cross-section shape selected from U-shaped, circular, oval, square, rectangular or trapezoidal and maybe hollow or solid.

Preferably the seal ring of elastomeric material is made from a heat resistant and oil resistant elastomeric material. Such a material may be a blend of neoprene and silicone rubbers.

In an alternative form the invention may be said to reside in a method of improving the compression ratio of an internal combustion engine including the step of removing the piston ring from the uppermost ring slot of each piston of the engine, inserting an O-ring into the uppermost piston ring slot and replacing the piston ring.

In a further form the invention may be said to reside in a sealing means to effect an improved seal of a compression ring of a piston of an internal combustion engine comprising an elastomeric material seal ring adapted to be fitted into a compression ring groove of the piston to engage with the rear or inner surface of the compression ring and an innermost peripheral surface of the compression ring groove.

Preferably the seal ring also engages a lower side surface of the compression ring groove.

It will be seen that by the various forms of the invention there is provided a seal ring behind the compression ring which is comprised of an elastomeric material such that a steady and even force is provided onto the rear of the compression ring to hold it evenly against the wall of the cylinder during the up and downstroke thereby preventing uneven wear and damage to the cylinder or to the piston ring.

Although the theory behind the successful operation of the seal ring of the present invention is not clear it may be that the action of the sealing ring during the compression stroke of the engine is one in which pressure of gasses through the upper part of the ring slot exerts a force onto the upper surface of the elastomeric seal ring thereby deforming the seat ring to cause a seal between the compression ring, the rear or inner surface of the compression ring groove and the lower surface of the compression ring groove.

Without the seal ring arrangement of the present invention a small percentage of compressed gas can pass the first piston ring but with the seal ring of the present invention escape of such gasses is prevented. Hence, in an engine which would normally have a compression ratio of perhaps 160 to 175 pounds per square inch, the compression ratio can be increased to 220 to 230 pounds per square inch. Such an increase in compression ratio can increase engine efficiency and may allow for use of cheaper fuels.

The seal ring system of the present invention may be used with engines powered with diesel fuel, petrol, LPG or LNG or any other suitable blend of fuel such as blends with methanol or alcohol.

In the case of a circular cross-section O-ring the diameter of the cross section of the O-ring is preferably 50 to 100% of the width or thickness of the piston ring. Hence for a 2 mm wide piston ring the diameter of the cross-section of the O-ring may be 1.5 mm.

The overall diameter of the O-ring may be such that the outer diameter of the O-ring may be the same as the outer diameter of the piston into which the O-ring is fitted. Hence when the O-ring is actually placed into a compression ring groove the O-ring is not in tension and may be slightly in compression when a compression ring is placed around it. This will assist with providing an outward force onto the rear or inner surface of the compression ring to provide even travel of the front surface of the compression ring on the cylinder wall.

A particular problem with gas powered engines is that the cleanliness of the fuels tends to cause glazing on the cylinder walls. This will cause blow-by of combustion gasses past the compression ring and this tends to restrict the amount of oil that can be deposited on the cylinder walls. By the use of the sealing system of the present invention, this blow-by will be prevented and the oil control ring and the oil scraper ring can deposit a suitable film of oil onto the cylinder wall thereby preventing glazing.

With petrol and diesel engines as well as with gas engines the fact that there is no blow-by of combustion gasses past the compression ring will mean that a certain amount of oil can be deposited on the surface of the piston and some of this oil can be carried up into the underside of the compression ring and carried into the compression ring groove to provide cooling and lubrication for the O-ring.

The method and device of the present invention may be used with a new engine or to improve the efficiency of a worn engine.

Where an engine has pistons with more than one compression ring then the application of the present invention may be to only one of the compression ring grooves.

This then generally describes the invention but to assist with understanding of the invention reference will now be made to the accompanying drawings which show preferred embodiments of the invention.

DETAILED DESCRIPTION OF THE DRAWINGS

Figure 1:
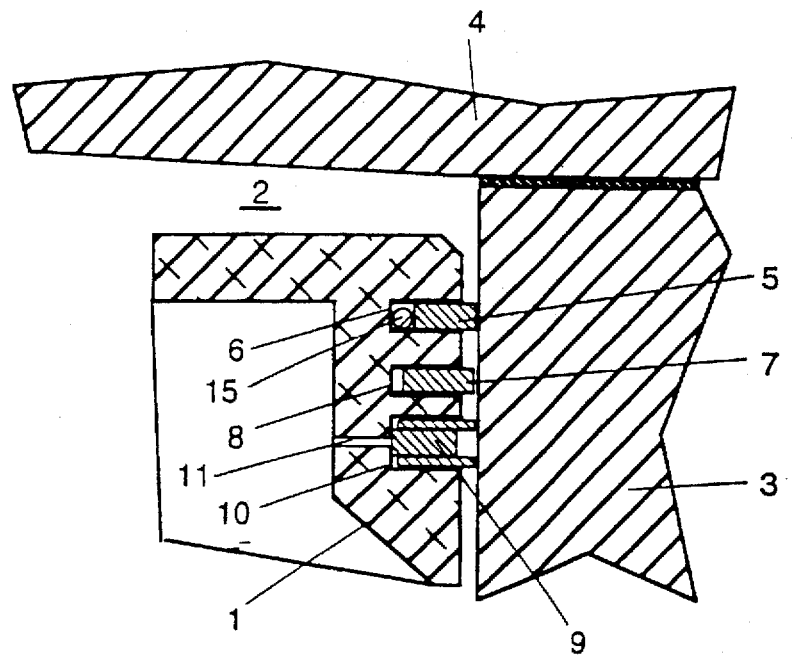
FIG. 1 shows a part sectional view of a cylinder of an internal combustion engine with a piston in it incorporating the seal ring of the present invention.
Figure 2:
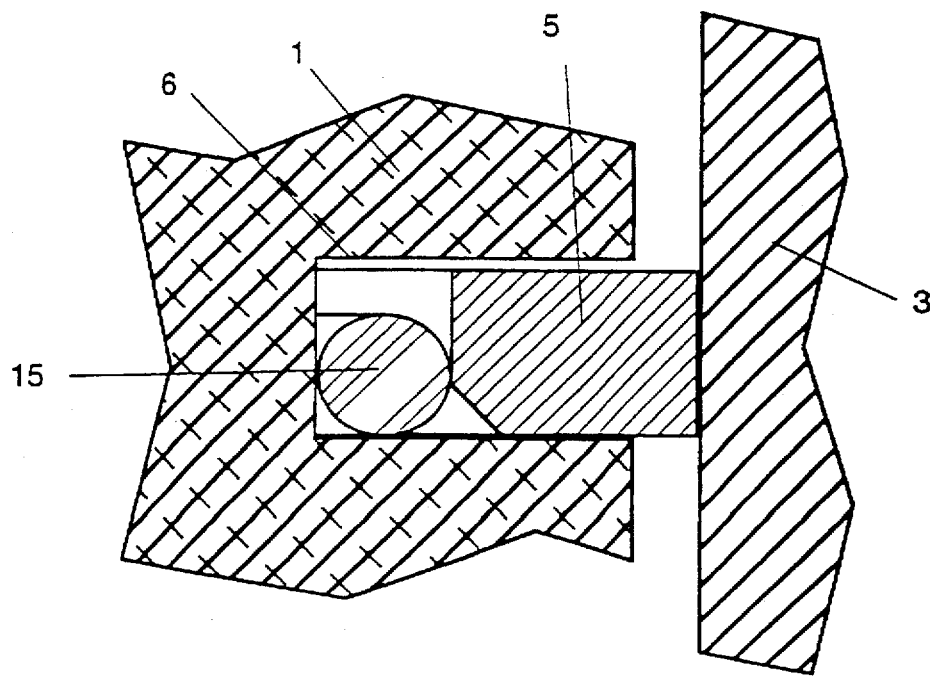
FIG. 2 shows a detailed view of a compression ring of a piston of an internal combustion engineshown in FIG. 1.
Figure 3:
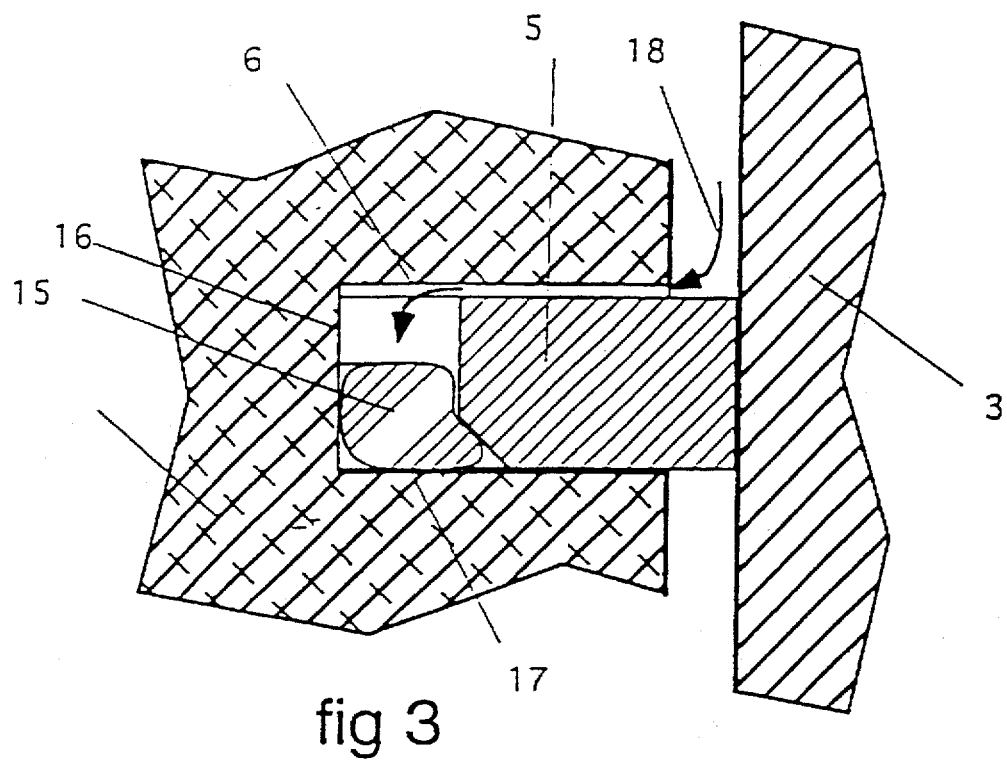
FIG. 3 shows a schematic view of the action of a compression ring and seal ring during actual operation.

Now looking more closely at the embodiment shown in FIG. 1 to FIG. 3 it will be seen that the internal combustion engine has a piston 1 travelling in a cylinder 2 defined by a cylinder wall 8 and a cylinder head 4. The piston 1 has three sealing rings. An uppermost sealing ring is a compression ring 5 in a compression ring groove 6, the ring having a thickness about equal to the axial width of the groove. The middle sealing ring is an oil scraper ring 7 in an oil scraper ring groove 8. The lowest ring is an oil control ring assembly 9 in an oil control ring groove 10. The oil control ring groove 10 includes an oil supply port 11 which supplies oil from the interior of the piston to the oil control ring.

The compression area of the piston 1 is shown in more detail in FIG. 2 and FIG. 3 and it will be particularly seen that a seal ring 15 has the form of a circular cross section O-ring and is placed behind (radially inward) the compression ring 5. It will be noted that at the relaxed position the O-ring 15 is not under significant compression.

As can be seen in FIG. 3 when the piston 1 is in a compression stroke and moving upwards compressed gasses are forced down between the cylinder wall 3 and the piston 1 and enter the very narrow gap at the top of the ring groove 6 above the compression ring 5 and enter the rear of the compression ring groove 6 behind the compression ring 5. If the seal ring 15 was not present then a certain amount of the combustion gasses could pass under the lower face or surface of the compression ring 5 and cause blow-by. It will be noted, however, that the force of the compressed gasses caused deformation of the O-ring which distorts it so that it seals against the rear (inner) surface of the compression ring 5 and the rear surface 16 of the ring groove 6 and also onto the lower surface 17 of the ring groove. By this means a sufficient seal is provided while at the same time maintaining an even forward force on the compression ring 5 against the cylinder wall 3 so that it travels up and down smoothly.

Figure 4:
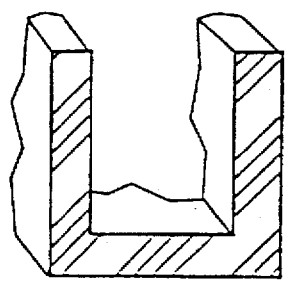
FIG. 4 shows a range of possible cross-sectional shapes of a seal ring according to the present invention.
Figure 4:
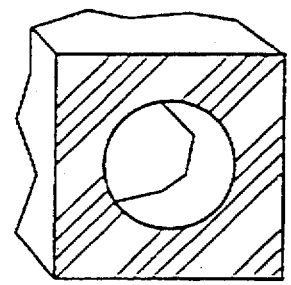
Figure 4:
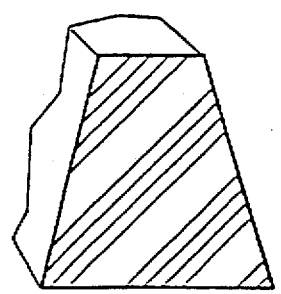
Figure 4:
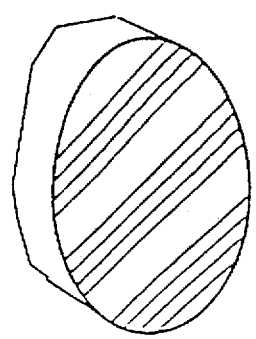
Figure 4:
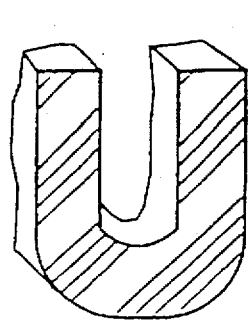
Figure 4:
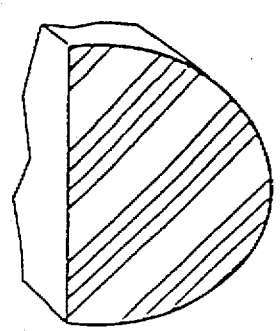

FIG. 4 shows several embodiments of possible cross-sections of O-rings which may be used as the seal rings of the present invention.

FIG. 4(a) shows a U-shaped cross-section O-ring which will be useful to provide sealing against the rear surface of the ring groove, the lower surface of the ring groove and the rear of the piston ring. FIG. 4(b) shows a square section seal ring with a hollow centre. FIG. 4(c) shows a trapezoidal cross-section seal ring. FIG. 4(d) shows an oval cross-section ring. FIG. 4(e) shows a U section seal ring similar to the seal ring shown in FIG. 4(a). FIG. 4(f) shows a semi-circular or semi-elliptical cross-section O-ring. Such a shape of O-ring may be used with the flat surface facing inwards, outwards, up or down.

Figure 5:
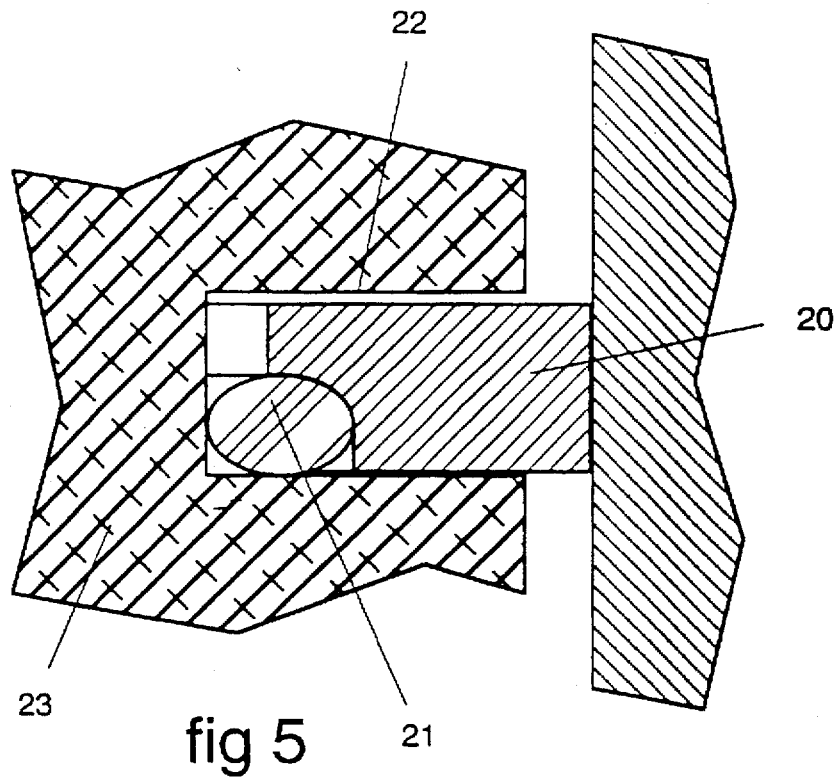
FIG. 5 shows an alternative embodiment of seal ring and compression ring of an internal combustion engine.

FIG. 5 shows an alternative embodiment of a seal ring and compression ring. In this embodiment the compression ring 20 includes a semi-circular recess at the rear bottom of the compression ring and an oval cross-section seal ring 21 is placed behind the compression ring in the ring groove 22 of the piston 23 to provide a seal.

Figure 6:
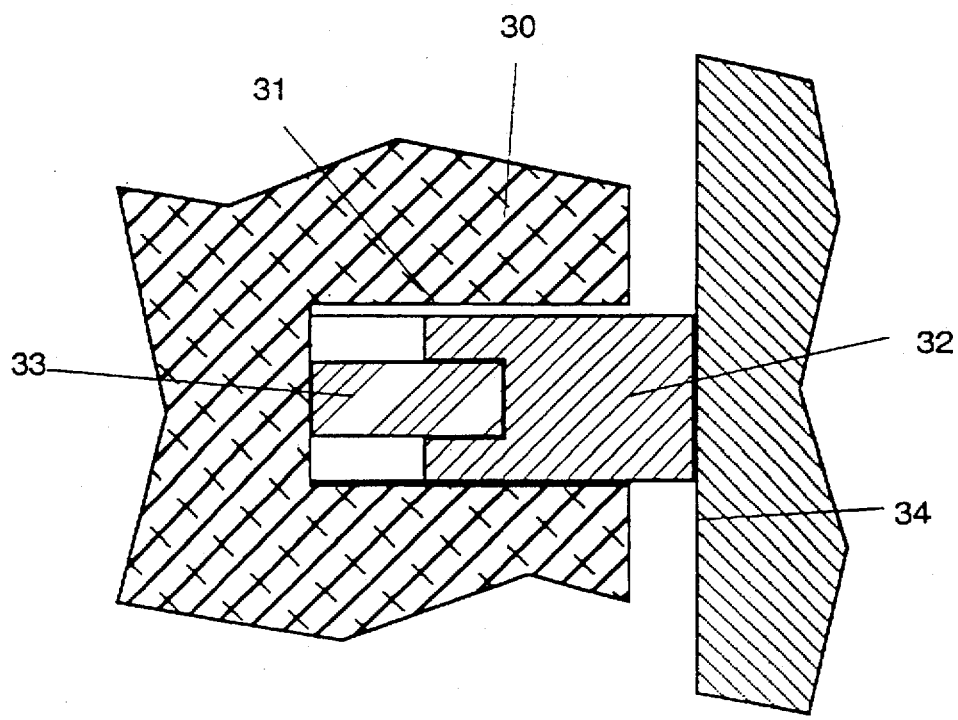
FIG. 6 shows a still further embodiment of a compression ring and a seal ring of the present invention.

The embodiment shown in FIG. 6 shows a piston 30 with a compression ring groove 31 with a compression ring 32 in the groove 31 which has a recess into its back surface into which is fitted a rectangular cross section O-ring 33. This form of O-ring provides a resilient force to hold the compression ring 32 evenly against the cylinder wall and provides sealing to prevent combustion and compressed gasses from passing behind the piston ring.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

I claim:

1. A piston having a diameter and of a type including a compression ring groove having an axial width and a radial depth, a compression ring having an axial thickness about equal to the axial width of the compression ring groove and being mounted in the compression ring groove, the compression ring being of a cross-sectional shape having an inner surface and upper and lower faces and a recess between its inner surface and its lower face, a sealing means in the compression ring groove behind the compression ring wherein the sealing means is an O-ring of a heat resistant elastomeric material, of a cross-sectional shape selected from the group consisting of circular and oval, and wherein the O-ring has an axial dimension of between about 50% and 100% of the axial thickness of the compression ring, said O-ring being configured to at least partially deform into the recess during the compression stroke of the piston.

2. The piston recited in claim 1, wherein the O-ring is a blend of neoprene and silicone rubbers.

3. The piston recited in claim 1, wherein the O-ring has an outside diameter substantially equal to the diameter of the piston.

4. A piston having a diameter and of a type including a compression ring groove having an axial width and a radial depth, a compression ring in the compression ring groove, the compression ring being of a cross-sectional shape having an inner surface and upper and lower faces and an angular bevel between its inner surface and its lower face, a sealing means in the compression ring groove behind the compression ring wherein the sealing means is an O-ring of a heat resistant elastomeric material which is a blend of neoprene and silicone rubbers, of a cross-sectional shape selected from the group consisting of circular and oval, and wherein the O-ring has an axial dimension of between about 50% and 100% of the axial thickness of the compression ring and an outside diameter substantially equal to the diameter of the piston.

* * * * *